March 15, 1966  O. E. LARSEN  3,239,881
APPARATUS FOR IMPACT EXTRUSION
Filed Dec. 8, 1961  4 Sheets-Sheet 2

INVENTOR.
O. E. LARSON
BY *Hudson & Young*
ATTORNEYS

March 15, 1966  O. E. LARSEN  3,239,881
APPARATUS FOR IMPACT EXTRUSION
Filed Dec. 8, 1961  4 Sheets-Sheet 3

INVENTOR.
O. E. LARSON
BY
ATTORNEYS

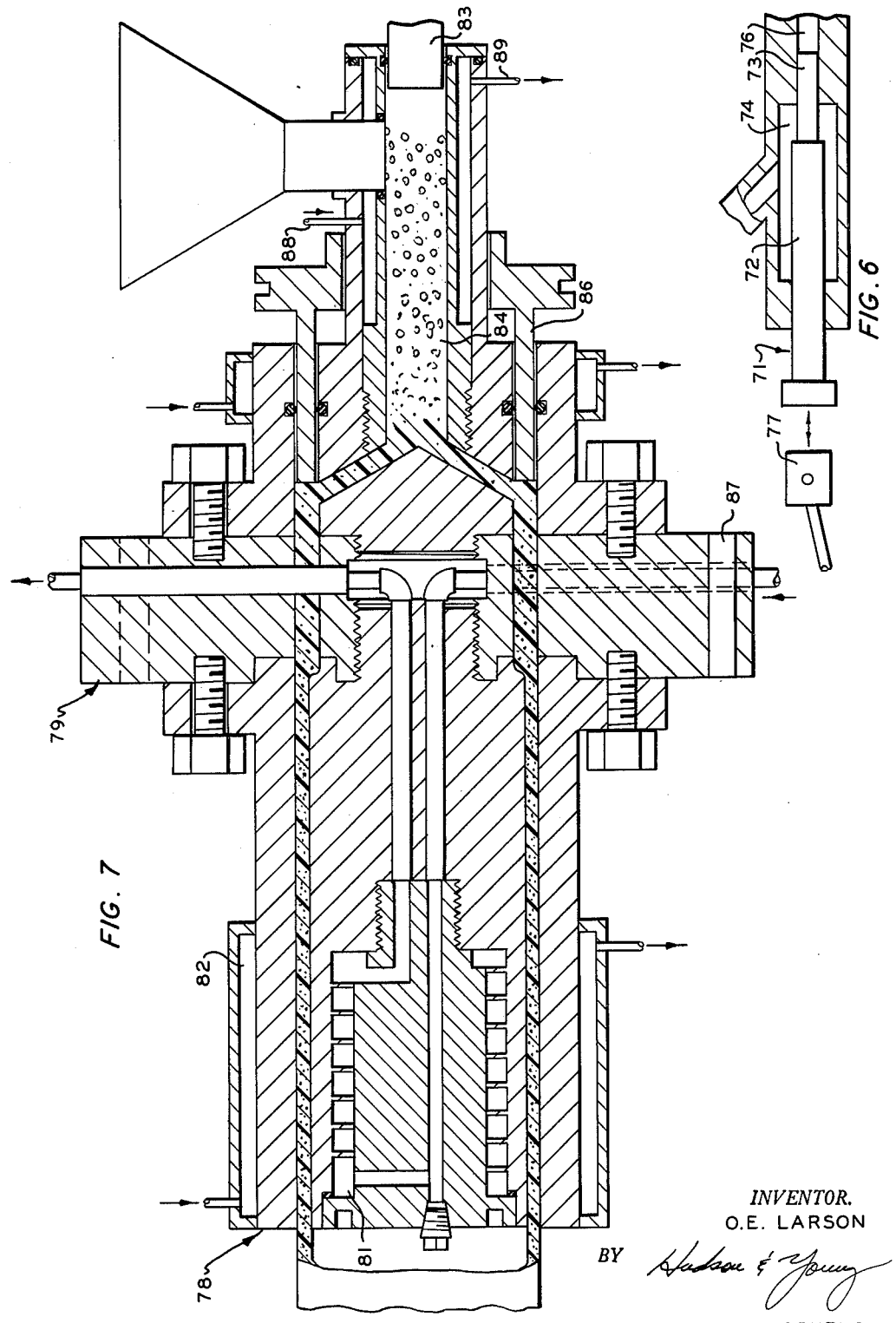

United States Patent Office 3,239,881
Patented Mar. 15, 1966

3,239,881
APPARATUS FOR IMPACT EXTRUSION
Olaf E. Larsen, Bartlesville, Okla., assignor to Phillips Petroleum Company, a corporation of Delaware
Filed Dec. 8, 1961, Ser. No. 157,992
4 Claims. (Cl. 18—12)

This invention relates to the extrusion of plastic material. In one aspect the invention relates to extrusion apparatus comprising a long land die in which the extruded material is solidified. In another aspect this invention relates to an extrusion process in which the extruded plastic material is solidified prior to leaving the die.

Extrusion is a frequently used technique in producing elongated profile shapes. It is often used, for example, in the production of pipe or tubing from the thermoplastic materials such as nylon, polyvinyl acetate, polyvinyl chloride, and polyolefins, for example polyethylene. The extrusion procedure ordinarily includes passing the material through a shaping die, then into a cooling bath, followed by cutting into desired lengths. However, at times it is difficult to maintain smooth surfaces and precise control of size and shape of the finished product. Such irregularities may affect either appearance or utility of the finished product.

An object of this invention is to produce accurately sized and shaped and smooth surfaced extruded products.

Another object of this invention is to produce high quality extruded plastic articles at relatively low cost.

Another object of this invention is to extrude and biaxially orient a plastic pipe in one continuous operation at relatively low cost.

Other objects, aspects and the advantages of my invention are apparent in the written description, the drawing, and the claims.

According to my invention there is provided extrusion apparatus comprising a long land die, means to force a plastic material through the die and means to provide a smoothly decreasing temperature gradient along the die to solidify the extruded material prior to removal from the die. The length of the land of the die is in the range of 10 to 100 times the thickness of the profile, preferably in the range of 20 to 60 times. Further according to my invention there is provided pipe extrusion apparatus comprising a long land die, means to force a plastic material through the die, means to provide a smoothly decreasing temperature gradient along the die to solidify the material prior to removal from the die, a sizing horn and means to draw the pipe from the die through the horn to orient the pipe biaxially. In one embodiment the means to force the plastic material into the die comprises a first plunger, means to reciprocate it, and a second plunger actuated by a lost motion connection with the means which reciprocates the first plunger. In another embodiment the means to force the material through the die comprises a slip joint connection between the die and a stationary portion of the extrusion apparatus, and a vibrator connected with the die. I found that in some instances it is advantageous to apply pressure impulses directly to the plastic melt being forced into the die. Where the impulses are applied to the melt an elongated plunger can be used, comprising two separate cylindrical sections to reduce the volume of melt which must be compressed to transmit the pressure to the material entering and flowing through the die.

Further in accordance with my invention there is provided an extrusion method comprising the steps of forcing a plastic melt into and through an extrusion zone while maintaining a smoothly decreasing temperature gradient along the zone to solidify the melt prior to removal from the die.

In the drawing, FIGURE 1 is a schematic elevation, partly in cross section, of a pipe extrusion apparatus including a long land die, an orienting horn, a water spray and positive traction takeoff means.

FIGURE 6 illustrates the use of an elongated feed plunger to reduce compressed melt.

FIGURE 7 is a cross section of a pipe extrusion apparatus.

Figure 1:
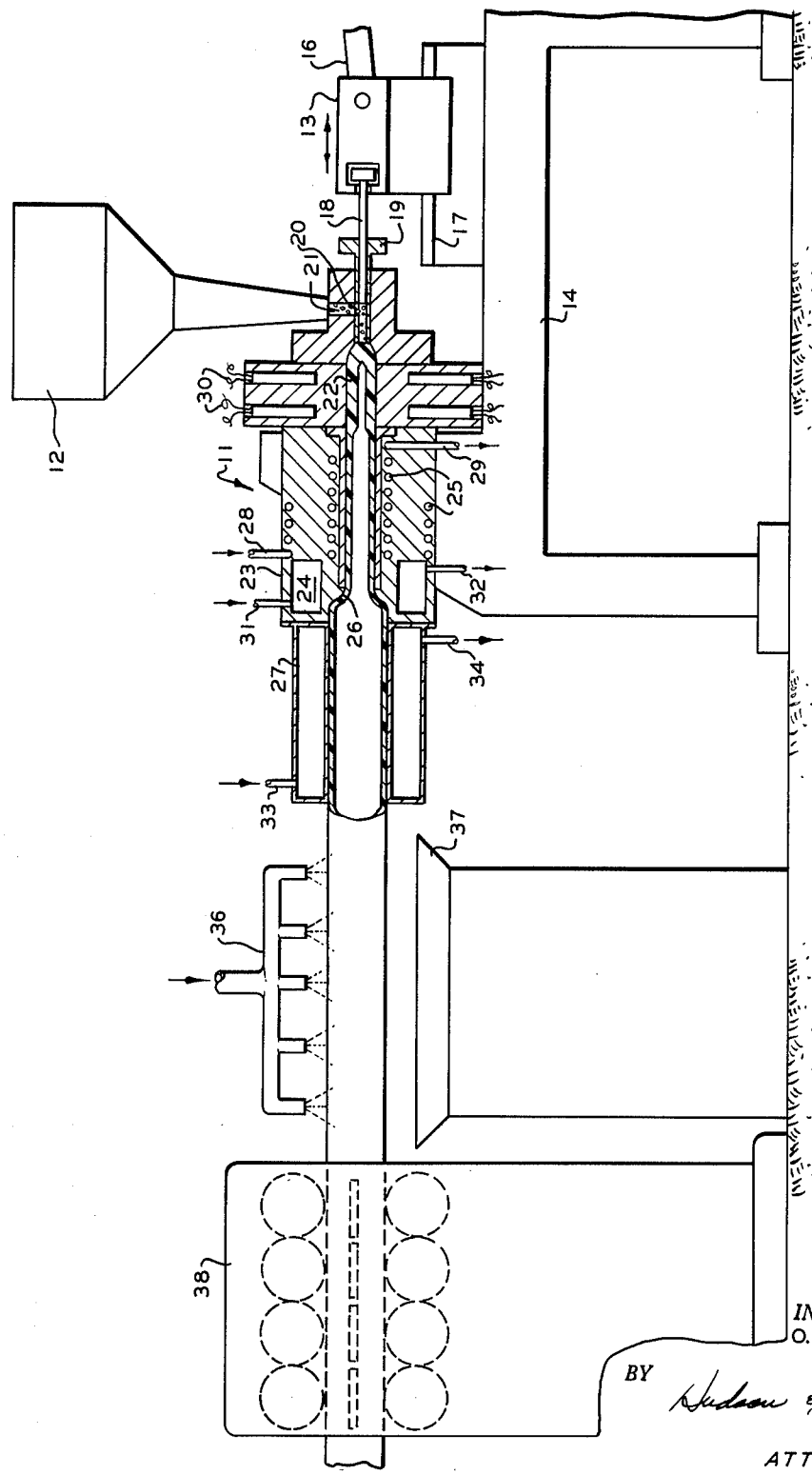

In the apparatus illustrated in FIGURE 1 a long land die 11, a feed hopper 12, and cross head 13 are all supported on a base 14. Cross head 13 is driven by a crank 16 powered by a suitable drive means (not shown) and reciprocates on a track 17. Cross head has attached to it a plunger 18 which extends through an annular plunger 19. Plunger 19 has a feed opening 20 which is aligned with feed passage 21 from hopper 12 when piston 19 is in its retracted position, to the right in FIGURE 1. Long land die 11 comprises a heating section 22 and a cooling section 23. As illustrated, the cooling section 23 includes both the cooling jacket 24 and a cooling coil 25. However, in many instances, cooling coil 25 is dispensed with, the temperature differential naturally existing in the body of metal between the heating portion and the cooling portion serving to provide a smoothly decreasing temperature gradient along the die. The outer end of die 11 flares to form an external sizing tube 26. Cylindrical sizing tube 27 can be placed adjacent sizing horn 26. Inlet and outlet water circulation tubes 28–29, 31–32, and 33–34, are connected with cooling coil 25, cooling chamber 24 and cylindrical sizing tube 27, respectively. A water spray 36 is provided above the extruded pipe with the collecting vessel 37 below. The positive traction power takeoff means 38 draws the pipe from the forming apparatus. Cartridge heaters 39 supply heat to heating section 22.

In the operation of the apparatus of FIGURE 1 a granular thermoplastic is fed through hopper 12, passage 21, and opening 20. As plunger 18 travels forward, to the left in FIGURE 1, the granular plastic is pushed ahead of it as the plunger closes opening 20. The plunger continues to the left, pushing the plastic forward into heating chamber 22. When cross head 13 has proceeded far enough to the left it contacts annular plunger 19 thus imparting a hammer blow to this plunger, causing it in turn to impart a high pressure impulse to the plastic material being extruded. As the operation proceeds the granules of plastic are made molten in heating chamber 22 and the plastic melt continues through long land die 11 gradually cooling as it proceeds until, when the material reaches the end of die 11 it is completely formed and sufficiently solidified to retain its shape. As the formed pipe is expanded through sizing horn 26 and drawn forward by takeoff means 38 the pipe is oriented biaxially. The expansion of the pipe in sizing horn 26 occurs as the result of fluid pressure applied internally by any suitable means known in the art.

Figure 2:
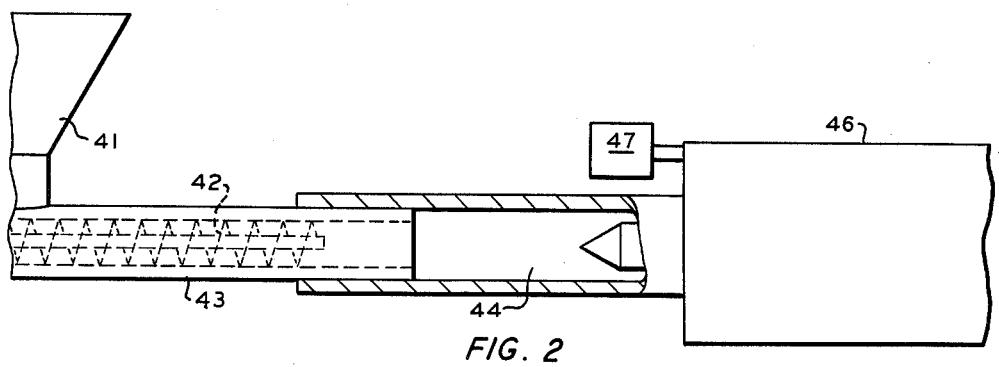
FIGURE 2 is a fragmentary cross section illustrating a slip joint for the die and a vibrator attached to the die.

In the embodiment illustrated in FIGURE 2 granular plastic material is fed from hopper 41, picked up by extruder screw 42, plasticized by working or heating or both and fed from the end of extruder tube 43 into the feed section 44 of long land die 46. Attached to die 46 is a vibrator 47, which can be actuated by suitable mechanical, pneumatic, electromagnetic, magneto-strictive or piezoelectric means. As die 46 is vibrated, including feed section 44, the outer end of tube 43 acts as a stationary piston to impart pressure impulses above the steady feed pressure exerted by extruder screw 42.

Figure 3:
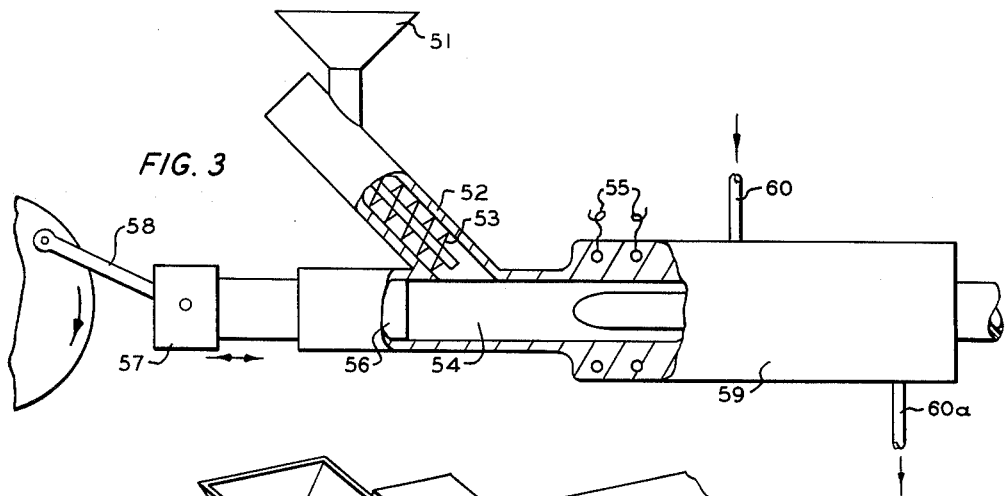
FIGURE 3 illustrates an apparatus in which pressure impulses are applied directly to the plastic melt.

In the apparatus of FIGURE 3 granular plastic is fed from hopper 51 into extruder tube 52 and moved forward by extruder screw 53 into feed section 54. A plunger 56 is attached to a cross head 57 which is driven by a suitable crank 58. A long land die 59 is connected with feed section 54 as shown. In operation, the granular material from hopper 51 is picked up and moved forward by extruder screw 53 and the material is plasticized by the working of this screw or the application of heat or a combination of the two so that a plastic melt is fed from extruder tube 52 into feed section 54. As cross head 57 reciprocates plunger 56 also reciprocates thus applying pressure impulses directly to the plastic melt in feed section 54 to force the material being extruded through die 59. Heaters 55 and collant inlet 60 and outlet 60a are provided.

Figure 4:
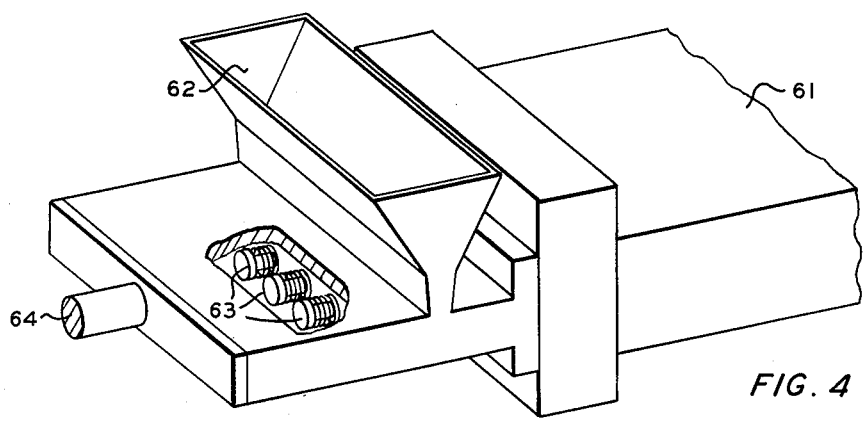
FIGURE 4 illustrates an apparatus designed especially for the extrusion of profiles having a large width to height ratio, a plurality of plungers being utilized.
Figure 4A:
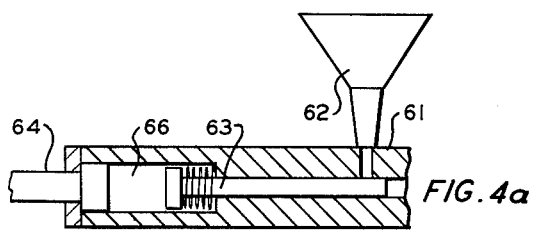
FIGURE 4a is a horizontal cross section of a portion of FIGURE 4.

My invention is applicable to the extrusion of a wide variety of profile shapes and configurations, including bar, rod, pipe and tubing, sheet, and irregular profiles. Where the longest dimension of the cross section is large as compared with the largest dimension at right angles thereto or where there is a long relatively thin protrusion in the profile cross section, it is preferred that either an elongated plunger or a plurality of smaller plungers be utilized. In these instances the above referred to longest dimension is considered to be the "width" and the dimension at right angles thereto is referred to as the "height." FIGURE 4 illustrates an apparatus for extruding a sheet and comprises a wide long land die 61, a feed hopper 62, a plurality of plungers 63 spaced across the width of the entrance to die 61, and a single plunger 64, larger than the plungers 63, to provide the pressures impulses which are transmitted through the plungers 63 to the feed material. Plunger 64 is driven by a suitable cross head and crank, not shown. As shown in FIGURE 4a, plunger 64 and the outer ends of plungers 63 are in a common chamber 66 which is filled with a suitable hydraulic fluid. Thus, as piston 64 is reciprocated pressure impulses are applied to plungers 63 and in turn to the plastic material being fed to die 61. Plungers 63 can also be driven by mechanical means such as a single large hammer which strikes the heads of all of plungers 63 simultaneously, a cross head connected to all of plungers 63, etc. However, to obtain uniform distribution of the extruded material, and the resulting uniform density of the extruded product, it is preferred that the hydraulic system illustrated in FIGURES 4 and 4a be utilized since this automatically compensates for slight temporary variations in the feed at intervals across the width of the die since individual plungers can move forward varying distances depending upon the amount of material fed directly in front of each plunger, thus maintaining a constant applied pressure across the entire width of the die.

Figure 5:
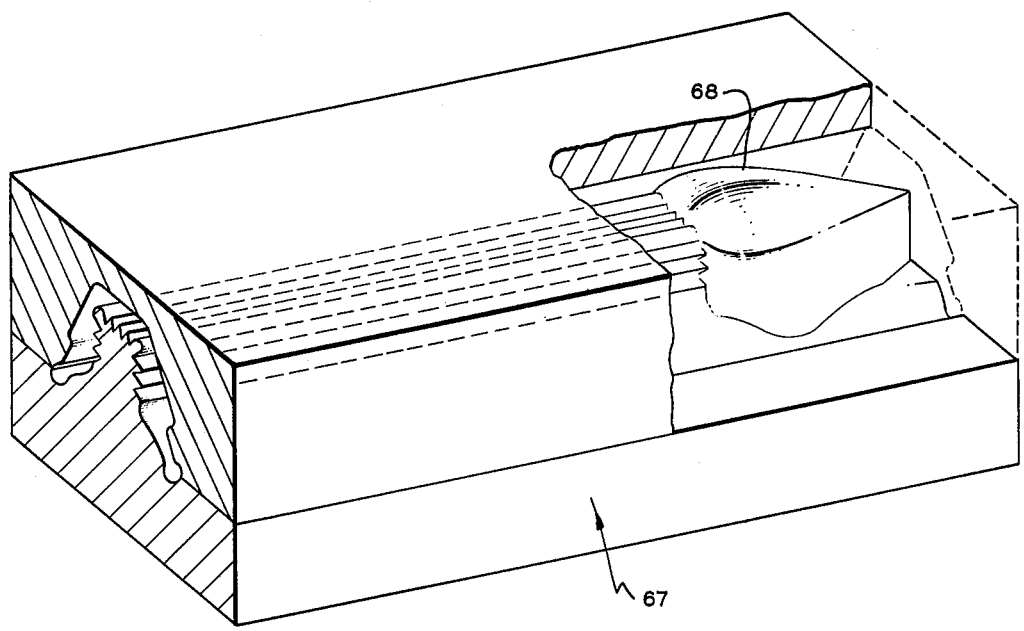
FIGURE 5 illustrates a long land die having a restricted entrance.

In some instances to obtain more precise control of the extruded product it is desirable to provide a restriction to flow at the entrance of the die. This is illustrated in FIGURE 5 in which the long land die 67 is provided with a restriction 68 at the entrance thereof. In this instance the restriction is formed by an enlargement of the die insert. However, of course, it could be made by an enlargement of the outer portion or both portions. It is important that the restriction flow smoothly into the desired final configuration.

In some instances with the use of an apparatus which applies pressure impulses directly to the plastic melt as illustrated in FIGURE 3 the compressibility of the melt is sufficient to reduce the effect of the pressure impulses applied thereto. FIGURE 6 illustrates a modification to overcome this difficulty. In this modification the body of the plunger displaces a very substantial portion of the melt thus reducing the effect of compressibility. Plunger 71 has a relatively large diameter portion 72 and a relatively small diameter portion 73. Large diameter portion 72 reciprocates within chamber 74 with sufficient clearance to form an annular passageway through which the melt passes with little restriction to flow. The smaller diameter portion fits within a cylindrical chamber 76 with a relatively small clearance. In the operation of this device the piston 71 is driven by a suitable mechanism which provides a rapid forward stroke and a relatively slow return stroke. This can be accomplished, for example, through the use of a cross head 77 which strikes piston 71 thus impelling it forward at a rapid rate while the return force is supplied by the pressure of the melt entering chamber 74. It has been found that, with proper clearance between small diameter portion 73 of piston 71 and cylindrical chamber 76 and the operation of the piston in the manner just described that the melt passes portion 73 on the back stroke thereof when piston 71 is moving relatively slowly but does not pass appreciably as portion 73 is propelled forward rapidly. Thus, the melt is permitted to feed by portion 73 but is given a pressure impulse applied directly to the melt at the entrance to the die on the forward stroke of piston 71. In a specific embodiment of the apparatus of FIGURE 6 portion 72 has a diameter of 0.395 inch, chamber 74, 0.594 inch, portion 73, 0.386 inch and chamber 76, 0.406 inch.

FIGURE 7 illustrates a modification especially suited for extruding pipe. A long land annular die 78 is provided with heater block 79 at the inlet thereof an internal and external coolant passageways 81 and 82 at the outlet thereof. A relatively long stroke primary plunger 83 moves the granular plastic material from feed passage 84 to the inlet of die 78. The material softens and finally is completely plasticized as it approaches and enters the inlet of die 78 which is maintained at a temperature above the melting point of the material being extruded. A secondary plunger 86 applies pressure impulses directly to the plastic melt at the inlet of die 78, piston 86 moving through a comparatively short stroke but applying a high pressure impulse. A plurality of cartridge heaters 87 are provided in heater block 79. If desired, suitable coolant passages 88 and 89 are provided around primary plunger 83 and secondary plunger 86, respectively, to prevent heating and the resultant variation in clearance at these points, and to prevent plasticizing the material prematurely thus avoiding feeding problems. As the operation of the apparatus of FIGURE 7 proceeds a completely formed and solidified pipe is extruded from the outlet of die 78.

The various embodiments of my invention are particularly applicable to the molding of ethylene polymers having a density of 0.94 or higher as, for example, such polymers prepared by chromium oxide catalyzed polymerization or organometal catalyzed polymerization. The density referred to is that determined by the method of ASTM D1505–57T. My invention also is particularly suited to the molding of particle form polyethylene produced by chromium oxide catalyzed polymerization in a liquid hydrocarbon at a temperature such that substantially all the polymer produced is insoluble in the hydrocarbon.

My invention also is applicable to the production of foamed plastic extrusions such as bar, rod and sheet stock. This can be done by feeding the extruder with solid plastic particles compounded with a blowing agent. Where necessary, a set of takeoff rolls can be used as a brake to keep the extrudate from blowing out of the die. In some instances a water bath for final cooling is desirable.

In this application, "thickness of the profile" is related to the thinnest portion of the cross section. For example in a pipe, thickness is the wall thickness, in a sheet it is the sheet thickness, in a rectangular bar, the shortest dimension. Where an extrusion has a long protrusion, the thickness of the protrusion should be used as the thickness of the profile. On the other hand, where the profile comprises a very irregular configuration, rather than using the thickness of a relatively short protrusion, it is better to use an average value obtained by dividing the area in question by the length of the section.

By long land die is meant a die having a passage length relatively large as compared with the profile thickness and a die in which a smooth temperature gradient is maintained from a temperature at its entrance above the melt temperature of the material being extruded, to a temperature below the solidification temperature at the exit end.

Throughout this application many of the elements of the apparatus are shown schematically to prevent unnecessary complications. Many details such as, for example, threads, bolts, other fasteners, and specific configuration to permit joining and disassembly of the various elements, temperature controls, supports, details of driving means, and other details and elements have all been eliminated from at least one of the figures describing my invention. Such details are well known in the art and many examples of such details are available to one wishing to practice my invention.

In the description of the embodiment of FIGURE 7 it is obvious that the plastic material being forced through heater block 79 must pass around the coolant inlet and outlet through this block, and also that the central manddrel must be supported from an outer member. This is accomplished by providing a spider between an outer member and the material through which the coolant passages are formed or, preferably, by providing a plurality of passageways for the plastic material in a solid member which supports the mandrel, the coolant passages being formed in the solid portion. For example, I found a particularly useful structure comprises a solid heater block having a plurality of passageways, for example, five, leading from the feed passage 84 to the inlet of die 78, the central, solid portion of the heater block serving as the support for the central mandrel. I found it to be advantageous to form the mandrel with an enlarged portion near the inlet, thus forming, with the outer member of the die, a restricted flow passage similar in function to the restriction 68 in FIGURE 5. If desired a central coolant passageway is provided in the mandrel and inlet and outlet conduits for the coolant fluid provided in the solid heater block.

Although I have illustrated and described embodiments of my invention utilizing electrical heaters, due to the relatively large mass of metal in the long land cooling die, I have also found that flame heating, especially heating by means of a gas flame from a ring burner surrounding the die, to be useful, the large mass of metal serving to distribute the heat evenly to the plastic material being extruded. Although in all embodiments illustrated in this application reciprocating pressure impulse applying means have been disclosed, I have also found that high pressure screw type pressure applying means can be utilized.

Although my invention is particularly well suited for use with the polyethylene materials named above, it is also applicable for use with other materials such as polyethylene produced by other processes, other polyolefins, copolymers such as polymers of ethylene with butene-1, and other extrudable thermoplastic materials, for example polyvinylchloride.

Reasonable variation and modification are possible within the scope of my invention which sets forth method and apparatus for extruding plastic materials utilizing a long land die and various modifications of pressure impulse feeding to produce an article which is completely formed and self supporting at the time it leaves the die.

I claim:

1. Extrusion apparatus comprising a long land die, said die having a land length in the range of 10 to 100 times the thickness of the profile, means to force a plastic melt into said die, comprising a first plunger, means to reciprocate said first plunger, a second plunger actuated by lost motion connection with said means to reciprocate said first piston, and means to provide a smoothly decreasing temperature gradient along said die to solidify said melt prior to removal from said die.

2. Pipe extrusion apparatus comprising a long land pipe die, said die comprising a single, uninterrupted, unitary metal forming passage, thereby providing means to form an extrudable material initially into the desired cross-sectional shape and to maintain said material in said shape continuously until solidified, said die having a land length in the range of 10 to 100 times the thickness of the profile, means to force said material through said die, comprising a feed passage communicating with said die and with a source of said material, a first plunger positioned to reciprocate in said feed passage to force said material therethrough, means to reciprocate said first plunger, a second plunger actuated by lost motion connection with said means to reciprocate said first plunger, means to provide a smoothly decreasing temperature gradient along said die to solidify said melt prior to removal from said die, a sizing horn, and means to draw said pipe from said die through said horn to orient said pipe biaxially.

3. Extrusion apparatus comprising a long land die, said die comprising a single, uninterrupted, unitary metal forming passage, thereby providing means to form an extrudable material initially into the desired cross-sectional shape and to maintain said material in said shape continuously until solidified, said die having a land length in the range of 10 to 100 times the thickness of the profile, means to force said material through said die, comprising a feed passage communicating with said die and with a source of said material, a first plunger positioned to reciprocate in said feed passage to force said material therethrough, means to reciprocate said first plunger, a second annular plunger surrounding said first plunger, means to actuate said second plunger by lost motion connection with said means to reciprocate said first plunger to inpart to said second plunger a hammer blow on each stroke of said first plunger, and means to provide a smoothly decreasing temperature gradient along said die to solidify said melt prior to removal from said die.

4. Pipe extrusion apparatus comprising a long land pipe die, said die comprising a single, uninterrupted, unitary metal forming passage, thereby providing means to form an extrudable material initially into the desired cross-sectional shape and to maintain said material in said shape continuously until solidified, said die having a land length in the range of 10 to 100 times the thickness of the profile, means to force said material through said die, comprising a feed passage communicating with said die and with a source of said material, a first plunger positioned to reciprocate in said feed passage to force said material therethrough, means to reciprocate said first plunger, a second annular plunger surrounding said first plunger, means to actuate said second plunger by lost motion connection with said means to reciprocate said first plunger, to impart to said second plunger a hammer blow on each stroke of said first plunger, means to provide a smoothly decreasing temperature gradient along said die to solidify said melt prior to removal from said die, a sizing horn, and means to draw said pipe from said die through said horn to orient said pipe biaxially.

(References on following page)

References Cited by the Examiner

UNITED STATES PATENTS

| | | | |
|---|---|---|---|
| 2,047,554 | 7/1936 | Fischer | 18—14 |
| 2,485,523 | 10/1949 | Ashbaugh | 18—12 |
| 2,736,064 | 2/1956 | Rubin | 18—55 |
| 2,747,224 | 5/1956 | Koch et al. | |
| 3,002,615 | 10/1961 | Lemilson | 18—12 |
| 3,090,075 | 5/1963 | Provinzano et al. | |

FOREIGN PATENTS 1,019,951   11/1957   Germany.

OTHER REFERENCES

Teflon Ram Extrusion, E. I. duPont de Nemours & Co., Nov. 15, 1954, (8 pages), 264–176.

ROBERT F. WHITE, *Primary Examiner.*

MICHAEL V. BRINDISI, ALEXANDER H. BRODMERKEL, *Examiners.*